United States Patent
Coffin et al.

(10) Patent No.: US 11,324,163 B2
(45) Date of Patent: May 10, 2022

(54) REEL BLADE AND MANUFACTURING METHOD

(71) Applicant: The Toro Company, Bloomington, MN (US)

(72) Inventors: Scott Michael Coffin, Plymouth, MN (US); Cody Schrupp, Cologne, MN (US)

(73) Assignee: The Toro Company, Bloomington, MN (US)

( * ) Notice: Subject to any disclaimer, the term of this patent is extended or adjusted under 35 U.S.C. 154(b) by 310 days.

(21) Appl. No.: 16/655,122

(22) Filed: Oct. 16, 2019

(65) Prior Publication Data

US 2020/0113132 A1 Apr. 16, 2020

Related U.S. Application Data

(60) Provisional application No. 62/746,473, filed on Oct. 16, 2018.

(51) Int. Cl.
| | | |
|---|---|---|
| *A01D 34/42* | (2006.01) | |
| *A01D 34/53* | (2006.01) | |
| *B21H 3/12* | (2006.01) | |
| *A01D 101/00* | (2006.01) | |

(52) U.S. Cl.
CPC .......... *A01D 34/53* (2013.01); *A01D 34/42* (2013.01); *A01D 2101/00* (2013.01); *B21H 3/12* (2013.01)

(58) Field of Classification Search
CPC .... A01D 2101/00; A01D 34/42; A01D 34/52; A01D 34/62; A01D 34/53
See application file for complete search history.

(56) References Cited

U.S. PATENT DOCUMENTS

| | | | | |
|---|---|---|---|---|
| 1,623,433 A | * | 4/1927 | Newton | A01D 34/42 56/254 |
| 1,754,188 A | * | 4/1930 | Coldwell | A01D 34/42 56/249 |
| 2,088,293 A | * | 7/1937 | Funk | A01D 34/42 56/249 |
| 2,199,919 A | * | 5/1940 | Limbach | A01D 34/46 56/253 |
| 2,509,343 A | * | 5/1950 | Henderson | A01D 34/52 56/294 |
| 2,526,821 A | * | 10/1950 | Jones | A01D 34/53 56/253 |
| 2,532,813 A | * | 12/1950 | Hussey | A01D 34/46 56/254 |
| 2,603,055 A | * | 7/1952 | Boyce | A01D 34/42 56/250 |
| 2,929,190 A | * | 3/1960 | Woody | A01D 34/42 56/249 |
| 3,624,988 A | * | 12/1971 | Aldred | A01D 34/42 56/7 |
| 4,191,007 A | * | 3/1980 | Check | A01D 34/42 56/14.7 |

(Continued)

FOREIGN PATENT DOCUMENTS

GB 1195848 A * 6/1970 ............. A01D 34/53

*Primary Examiner* — Adam J Behrens
(74) *Attorney, Agent, or Firm* — Inskeep IP Group, Inc.

(57) ABSTRACT

A reel for a reel mower having reference grooves formed in the shaft thereof and usable as datum to ensure ends formed in the shaft are concentrically aligned and for sharpening and truing maintenance operations.

14 Claims, 2 Drawing Sheets

(56) References Cited

U.S. PATENT DOCUMENTS

| | | | | |
|---|---|---|---|---|
| 5,402,629 A | * | 4/1995 | Masaru | A01D 34/52 56/17.2 |
| 5,896,734 A | * | 4/1999 | Chesack | A01D 34/475 56/249 |
| 10,906,047 B2 | * | 2/2021 | McKellar | B02C 18/186 |

* cited by examiner

REEL BLADE AND MANUFACTURING METHOD

RELATED APPLICATIONS

This application claims benefit of and priority to U.S. Provisional Application Ser. No. 62/746,473 filed Oct. 16, 2018 entitled Reel Blade And Manufacturing Method, which is hereby incorporated herein by reference in its entirety.

BACKGROUND OF THE INVENTION

Turf mowers typically use either a rotary blade or a reel blade. A rotary blade mower uses a propeller-like blade that spins around a vertical axis. The blades do not act against a stationary blade, and thus rely on high impact speeds to cut grass. These blades are ineffective for very short mowing heights, such as is required to mow golf greens and the like. Reel mowers use cylinders, referred to as reels, that rotate on a horizontal and centered axis reel shaft which is attached to vertical supporting plates that attaches multiple helical blades. The reel with its helical blades rotate against a straight, stationary blade, commonly referred to as a bedknife. When a rotating helical blade swipes against the stationary bedknife, the blades act against each other like a pair of scissors creating very precise cutting action. These blades are useful for mowing heights measured in the thousandths of an inch.

The highly precise reel mowers can be difficult to manufacture. The reel is a relatively heavy component, which has a shaft in the center with machined ends for bearings to allow the reel to spin on its center. Traditional production involves machining the ends of the center shaft before welding supporting plates and helical reel blades to the center shaft. Typically the center shaft is a solid bar or tubing from a mill, and assumes the shaft material is fairly straight. However, mill tolerances do not guarantee the straightness required for threaded attachments on the ends of the center shafts or for locating from when regrinding the reel to sharpen and remove a cone shape due to uneven wear.

A finished reel in a cutting unit will drive attachments, for examples, a rear roller brush and groomer attachments. These attachments rely on the ends of the center shaft being in line with each other, which is also identified or commonly described as run-out between the attachment and reel. This run-out must be minimal for best performance and durability for the attachment. If the ends of the center shaft are not in line with each other, the run-out, or error, is magnified by the attachment being located farther away from the end of the center shaft.

It would thus be advantageous to manufacture a reel shaft in a manner that keeps the ends in line with each other and to reduce any inaccuracies/add beneficial features.

OBJECTS AND SUMMARY OF THE INVENTION

The present invention is directed toward reducing the aforementioned problems by machining reference grooves, also commonly known as datums, in the outer diameter of the reel shaft that can be used during the machining of the reel shaft ends. These datums can also be used later during sharpening/grinding maintenance operations by the owner/operator to use as a reference point to locate off for both ends of the reel to grind a parallel cylinder to the reel shaft.

In one aspect of the invention there is provided a method of manufacturing a reel shaft for a reel mower that includes placing an unfinished reel shaft, either a solid bar or tubing, in a cutting machine such as a machining center. The machining center forms two grooves, a first groove (datum A) and a second groove (datum B) in the work piece of equal (to a predetermined tolerance) diameter. Datum A and B are concentric. The workpiece is then relocated in the machining center such that datum A and B are used as connection points, thus ensuring any further work done on the piece is concentric. The ends of the piece, outside the datum, are then machined, resulting in ends that are concentric with each other and the datum. This effectively eliminates runout errors that can occur when accessories are connected to the ends of the shaft.

Another aspect of the invention is a reel for a mower including a shaft and at least one helical blade attached to the shaft. The shaft includes a first end, a second end, a first reference groove (datum A) proximate the first end, and a second reference groove (datum B) proximate the second end. The first and second reference grooves (datums A & B) are concentric with each other and both machined ends. Included in the machined ends are any machining to the center of the shaft, for instance, having internal threads. The first and second reference grooves (datums A & B) also have equal diameters.

BRIEF DESCRIPTION OF THE DRAWINGS

These and other aspects, features and advantages of which embodiments of the invention are capable of will be apparent and elucidated from the following description of embodiments of the present invention, reference being made to the accompanying drawings, in which.

DESCRIPTION OF EMBODIMENTS

Figure 1:
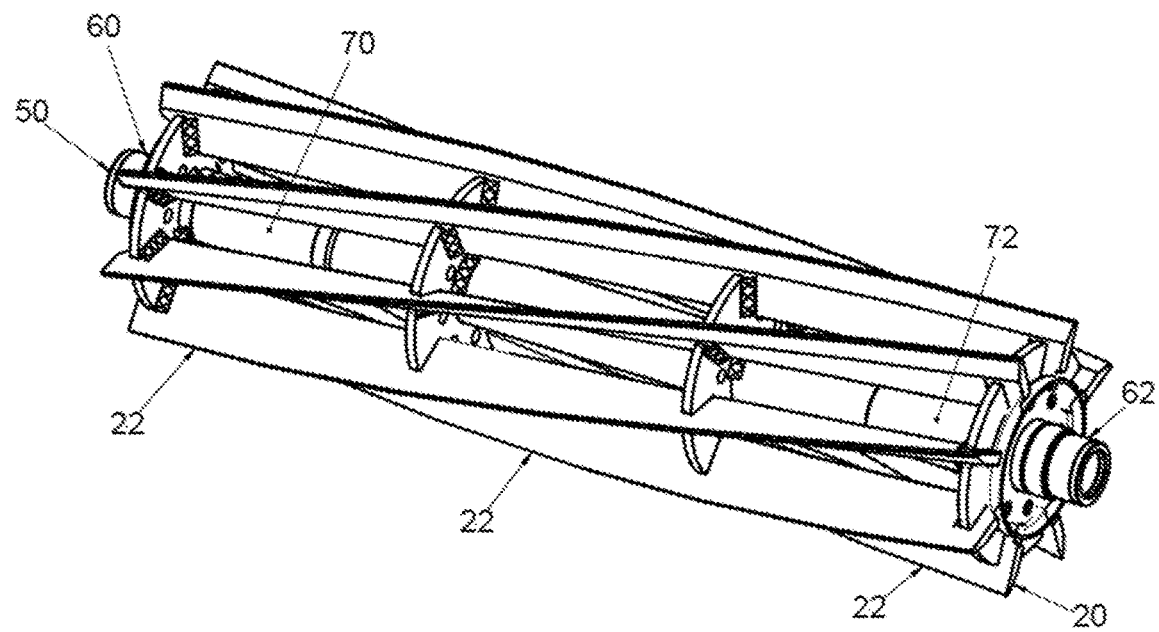
FIG. 1 is a perspective view of an embodiment of a reel of the invention.

Specific embodiments of the invention will now be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements.

Figure 2:
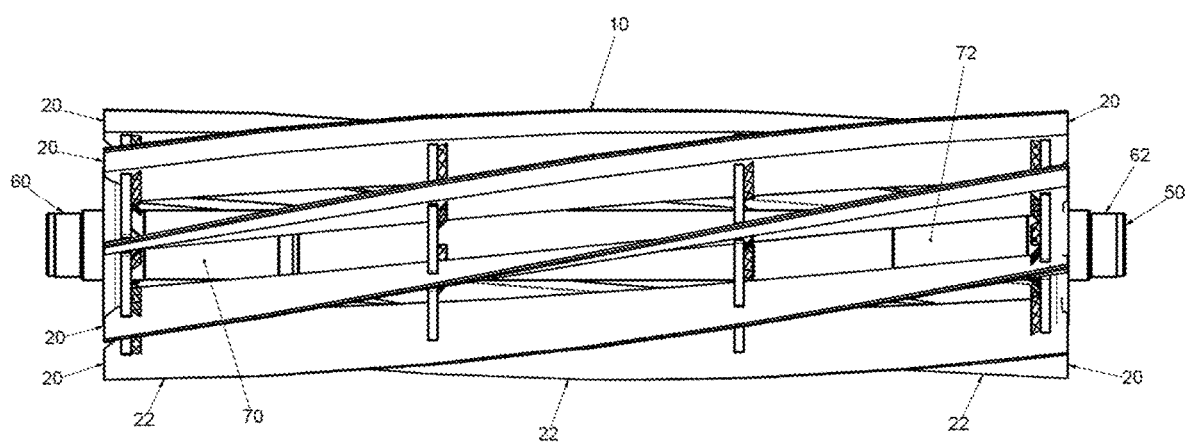
FIG. 2 is an elevation of an embodiment of a reel of the invention.

Referring now to FIGS. 1 and 2, there is shown a reel 10 of the invention. Reel 10 generally includes a plurality of reel blades 20 attached to a reel shaft 50, which is either a solid bar or tubing. The reel blades are helical and have sharpened edges 22.

Figure 3:
FIG. 3 is an elevation of an embodiment of a reel of the invention with the blades removed to show detail.

The reel shaft 50 has a first end 60, a second end 62, a first reference groove 70 and a second reference groove 72. Both grooves 70 and 72 are concentric and have a diameter that is within a predetermined tolerance, preferably less than 1/100th of an inch. FIG. 3 shows the shaft 50 with the blades 20 removed to provide an unobstructed view of the shaft 50. It can be seen that grooves 70 and 72 have a slightly reduced diameter.

Grooves 70 and 72 can be used as a reference points, or datums, for machining the ends 60 and 62, as will be explained in greater details below. As a result, ends 60 and 62 are concentrically aligned. Ends 60 and 62 may have different diameters, and/or have internal threads, depending on the design of the reel mower. The datums, however, ensure that the ends 60 and 62 are concentric with each other.

Reference grooves 70 and 72 ensure accuracy when sharpening the reel blades. During a typical sharpening operation, a grinder is used to hone the edges 22. Measurements from the shaft 50 to the edge 22 are taken to ensure the edge 22 remains parallel to the shaft 50. However, if there is a curve or other imperfection in the shaft, this measuring method will reproduce the errors onto the blade edge 22. If the blade edges are not parallel to the shaft 50, or to the bedknife, the grass blades will not be cut to an even height. Variations in grass blade height become very visible on fine grass fields, such as golf fairways, as the variations are reproduced on every pass of the mower and result in stripes that follow the path of the mower. Additionally, if the bedknife is spaced apart too far from the mower, the cut of the grass blade will not be clean, resulting in frayed edges on the grass that can turn brown.

The present invention allows the technician, and or sharpening machine, to use the reference grooves 70 and 72 as datums during the grinding operation. Thus, the blades edges 22 have a constant and concentric diameter, regardless of the curvature that may exist or developed in the shaft 50. Indeed, the sharpening process using the reference grooves 70 and 72 ensures that the blade 20 is reconditioned back to new production form, even through multiple sharpenings over time.

Manufacturing the reel blade of the present invention involves placing a workpiece in a machining center that will become the reel shaft 50. The workpiece may be a solid bar or a length of tubing. The ends of the workpiece are secured in the machining center and the machining center forms grooves 70 and 72 to diameters that are as close in diameter and as concentric as possible within the capabilities of the machining center, typically less than $1/100$th of an inch. The grooves 70 and 72 are formed such that the width of each is sufficient to be used as a connection point to secure the workpiece into the machining center.

Once the grooves 70 and 72 are formed, the workpiece or shaft 50 is repositioned in the machining center using the grooves 70 and 72 as connection points in order to machine the ends 60 and 62. Doing so ensures that ends 60 and 62 are concentric, regardless of the differences in diameters or features that are placed on each, such as internal or external threads, or the like.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A method of manufacturing a reel shaft for a reel mower comprising forming a plurality of reference grooves in the reel shaft; each reference groove being concentric with each other and configured to be useable as a connection point for sharpening a reel blade without regard for longitudinal curvature in the reel shaft.

2. The method of claim 1 wherein said forming a plurality of reference grooves further comprises forming the plurality of reference grooves such that each of said plurality of reference grooves has an equal diameter within a tolerance of $1/100$th of an inch.

3. The method of claim 1 wherein forming a plurality of reference grooves in the reel shaft comprises:
   placing an unfinished reel shaft in a machining center, the reel shaft having a first end and a second end;
   forming a first groove in the reel shaft proximate the first end, the first groove having a diameter;
   forming a second groove in the reel shaft proximate the second end, the second groove having the same diameter as the first groove;
   machining the first end to a desired diameter using the first groove as a datum;
   machining the second end to a desired diameter using the second groove as a datum.

4. The method of claim 3 wherein placing an unfinished reel shaft in a machining center comprises placing a solid bar in a machining center.

5. The method of claim 3 wherein placing an unfinished reel shaft in a machining center comprises placing a length of tubing in a machining center.

6. The method of claim 1 wherein forming a plurality of reference grooves in the reel shaft comprises forming two reference grooves.

7. The method of claim 6 wherein forming two reference grooves comprises forming a first reference groove proximate a first end of the shaft and forming a second reference groove proximate a second end of the shaft.

8. The method of claim 3 wherein placing the unfinished reel shaft in the machining center comprises placing the unfinished reel shaft in the machining center such that the shaft is held by the machining center at the first and second ends.

9. The method of claim 3 wherein the steps of machining the first end to a desired diameter using the first groove as a datum and machining the second end to a desired diameter using the second groove as a datum comprises releasing the first and second ends of the shaft from the machining center and connecting the shaft to the machining center at the first and second reference grooves.

10. A reel for a mower comprising:
    a shaft having:
      a first end;
      a second end;
      a first reference groove proximate the first end;
      a second reference groove proximate the second end;
      wherein the first and second reference grooves and first and second ends are concentric and configured to be used as datums during a grinding operation without regard to a longitudinal curvature of the shaft;
      wherein the first and second reference grooves have equal diameters within a tolerance of less than $1/100$th of an inch;
    at least one helical blade attached to the shaft.

11. The reel of claim 10 wherein the first and second ends have internal machining that are concentric to each other.

12. The reel of claim 11 wherein the internal machining comprises threads.

13. The reel of claim 10 wherein the first and second reference grooves are formed by a machine and wherein the shaft is not removed from the machine between forming the first reference groove and forming the second reference groove.

14. A method of sharpening a reel mower comprising:
   a) grinding a sharpened edge on a helical blade of a reel mower;

b) using a first reference groove proximate a first end of a reel blade assembly to measure a first distance between the first reference groove and the sharpened edge;

c) using at least a second reference groove spaced apart from the first reference groove to measure at least a second distance from the second reference groove to the sharpened edge;

repeating steps a)-c) until the first distance and the second distance are within an acceptable tolerance of each other.

\* \* \* \* \*